United States Patent
Zhang et al.

(10) Patent No.: US 11,227,194 B2
(45) Date of Patent: Jan. 18, 2022

(54) SENSOR SYNCHRONIZATION OFFLINE LAB VALIDATION SYSTEM

(71) Applicant: Baidu USA LLC, Sunnyvale, CA (US)

(72) Inventors: Manjiang Zhang, Sunnyvale, CA (US); Kwan Oh, Sunnyvale, CA (US); Tiffany Zhang, Sunnyvale, CA (US); Yaoming Shen, Sunnyvale, CA (US); Jeongho Lyu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 93 days.

(21) Appl. No.: 16/513,660

(22) Filed: Jul. 16, 2019

(65) Prior Publication Data

US 2021/0019578 A1    Jan. 21, 2021

(51) Int. Cl.
G06K 9/62     (2006.01)
H04N 5/225    (2006.01)
G06T 7/80     (2017.01)
G06K 9/00     (2006.01)

(52) U.S. Cl.
CPC ....... *G06K 9/6288* (2013.01); *G06K 9/00791* (2013.01); *G06T 7/80* (2017.01); *H04N 5/2258* (2013.01)

(58) Field of Classification Search
None
See application file for complete search history.

(56) References Cited

U.S. PATENT DOCUMENTS 10,044,922 B1 *  8/2018  Bradski ............. H04N 5/2224
10,482,003 B1 * 11/2019  Bondor ............. B60W 60/00
2015/0330774 A1 * 11/2015  Grauer .............. G01S 7/4811
                                                    348/135
2017/0109644 A1 *  4/2017  Nariyambut Murali ......
                                                    G06N 20/00
2017/0124781 A1 *  5/2017  Douillard ......... G08G 1/096816
2018/0307238 A1 * 10/2018  Wisniowski ........... G01S 17/86

(Continued)

OTHER PUBLICATIONS

S. Schneider, M. Himmelsbach, T. Luettel and H. Wuensche, "Fusing vision and LIDAR—Synchronization, correction and occlusion reasoning," 2010 IEEE Intelligent Vehicles Symposium, San Diego, CA, 2010, pp. 388-393, doi: 10.1109/IVS.2010.5548079. (Year: 2010).*

(Continued)

*Primary Examiner* — Andrae S Allison
(74) *Attorney, Agent, or Firm* — Womble Bond Dickinson (US) LLP

(57) ABSTRACT

The disclosure describes various embodiments of validating data synchronization between an active sensor and a passive sensor. According to an exemplary method of validating sensor synchronization between an active sensor and a passive sensor, a synchronization device receives a first signal from the active sensor, the first signal indicating that the active sensor has transmitted laser points to a measure board. In response to the first signal, the synchronization device transmits a second signal to the passive sensor to trigger the passive sensor to capture an image of the measure board. A synchronization validation application can perform an analysis of the image of the measure board in view of timing of the first signal and second signal to determine whether the passive sensor and the active sensor are synchronized with each other.

20 Claims, 7 Drawing Sheets

(56) References Cited

U.S. PATENT DOCUMENTS

| | | | |
|---|---|---|---|
| 2019/0080431 A1* | 3/2019 | Choi | G06T 5/50 |
| 2019/0120948 A1* | 4/2019 | Yang | H04N 5/2329 |
| 2019/0287310 A1* | 9/2019 | Kopeinigg | G06Q 50/01 |
| 2020/0174130 A1* | 6/2020 | Banerjee | G06T 7/55 |

OTHER PUBLICATIONS

Veitch-Michaelis, J. L. Fusion of LIDAR with stereo camera data: an assessment. Diss. UCL (University College London), 2017. (Year: 2017).*

Huang, Yu; Deep Learning-based Time Synchronization and Calibration between LiDAR and Camera, 2019, https://medium.com/@yuhuang_63908/deep-learning-based-time-synchronization-and-calibration-between-lidar-and-camera-3e87865edf7f (Year: 2019).*

Yang, Luodai, et al. "HydraView: Asynchronized 360°-View of Multiple Sensors for Autonomous Vehicles." 2020 International Conference on Connected and Autonomous Driving (MetroCAD). IEEE, 2020. (Year: 2020).*

Zhou, Lipu, Zimo Li, and Michael Kaess. "automatic extrinsic calibration method s." 2018 IEEE/RSJ International Conference on Intelligent Robots and Systems (IROS). IEEE, 2018. (Year: 2018).*

Montoya O., Icasio O., Salas J. (2020) COUPLED: Calibration of a LiDAR and Camera Rig Using Automatic Plane Detection. In: Figueroa Mora K., Anzurez Marín J., Cerda J., Carrasco-Ochoa J., Martínez-Trinidad J., Olvera-López J. (eds) Pattern Recognition. MCPR 2020. (Year: 2020).*

Q. Liao, Z. Chen, Y. Liu, Z. Wang and M. Liu, "Extrinsic Calibration of Lidar and Camera with Polygon," 2018 IEEE International Conference on Robotics and Biomimetics (ROBIO), 2018, pp. 200-205, doi: 10.1109/ROBIO.2018.8665256. (Year: 2018).*

* cited by examiner

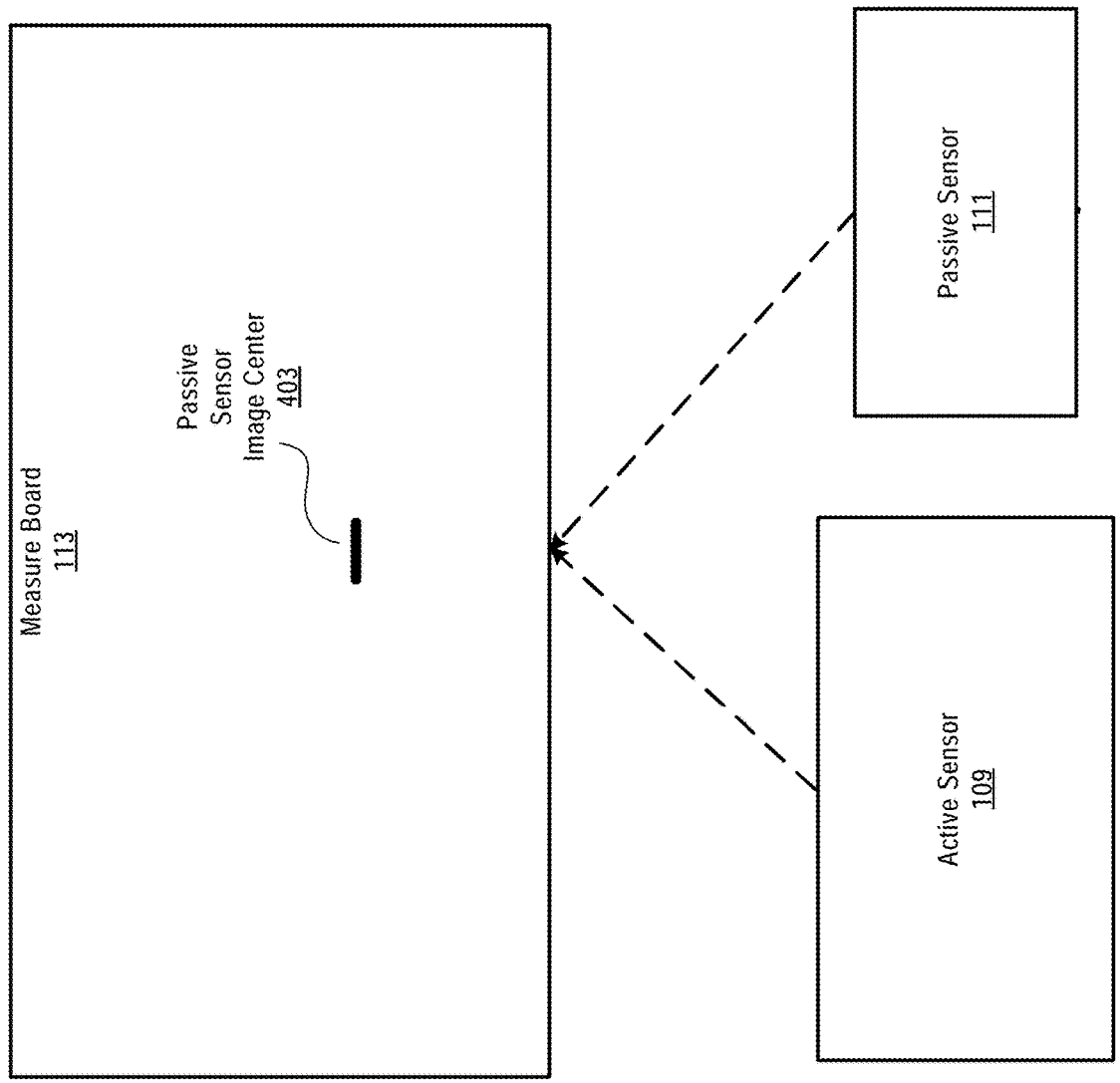

SENSOR SYNCHRONIZATION OFFLINE LAB VALIDATION SYSTEM

TECHNICAL FIELD

Embodiments of the present disclosure relate generally to operating autonomous vehicles. More particularly, embodiments of the disclosure relate to sensor data synchronization validation.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

The onboard sensors can include active sensor and passive sensors. An active sensor, e.g., a light detection and ranging (LiDAR) device, can provide its own energy source for illumination; whereas a passive sensor, e.g., a camera, can only detect energy that is naturally available. To increase the certainty and precision of estimates of a target object, data from the active sensors and passive sensors need to be synchronized into a single description of the target object.

Sensor data synchronization requires the support of software applications and hardware components, which need to be validated before they can be used on an autonomous driving vehicle (ADV) in real time.

Although the software applications and hardware components can be validated online in an ADV in real time, such online validation requires substantial efforts to set up sensors, and may lack the level of validation accuracy and long-term stability tests provided by offline validation equipment.

BRIEF DESCRIPTION OF THE DRAWINGS

Embodiments of the disclosure are illustrated by way of example and not limitation in the figures of the accompanying drawings in which like references indicate similar elements.

FIG. 4A, FIG. 4B, and FIG. 4C illustrate example validation scenarios according to one embodiment.

DETAILED DESCRIPTION

Figure 1:
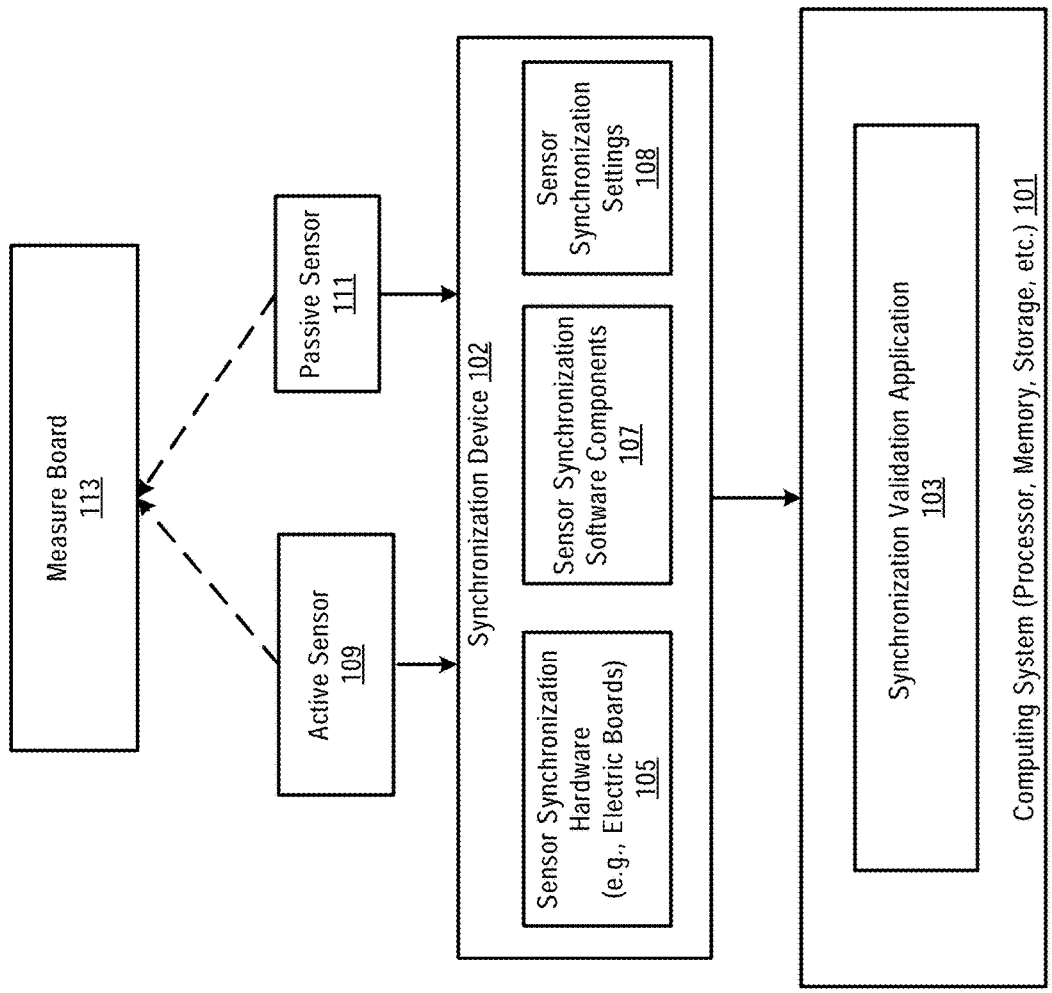
FIG. 1 illustrates an example system for validating sensor data synchronization between an active sensor and a passive sensor according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The disclosure describes various embodiments for validating data synchronization between an active sensor and a passive sensor. The disclosure uses a LiDAR device and a camera for illustration purposes. Some of the features described herein can also be used to validate sensor synchronization between another type of active sensor and another type of passive sensor.

According to an exemplary method of validating sensor synchronization between an active sensor and a passive sensor, a synchronization device receives a first signal from the active sensor, the first signal indicating that the active sensor has transmitted laser points to a measure board. In response to the first signal, the synchronization device transmits a second signal to the passive sensor to trigger the passive sensor to capture an image of the measure board. A synchronization validation application can perform an analysis of the image of the measure board in view of timing of the first signal and second signal to determine whether the passive sensor and the active sensor are synchronized with each other.

In one embodiment, the synchronization device includes one or more electric circuits and one or more software modules for use in synchronizing sensor data from the active sensor and the passive sensor. The synchronized device includes a number of synchronization settings, with each of the synchronization settings specifying a trigger delay for the passive sensor and a corresponding target area by the active sensor on the measure board. The synchronization settings include a positive trigger delay, a zero trigger, and a negative trigger delay. The trigger delay enables a synchronization point between the active sensor and the passive sensor to fall in the corresponding target area.

In one embodiment, when performing the analysis of the image of the measure board, the synchronization validation application can perform the operations of determining that the image captures at least a portion of the laser points on the measure board; determining that a synchronization point between the active sensor and the passive sensor is located at a position defined by one of the synchronization settings; and generating an indication that the active sensor and the passive sensor are synchronized.

In another embodiment, when performing the analysis of the image of the measure board, the synchronization validation application can perform the operations of determining that the image does not capture any laser points on the measure board; and generating an indication that the active sensor and the passive sensor are unsynchronized.

In one embodiment, a validation system can include a measure board, a synchronization device, and a synchronization validation application. The synchronization device includes one or more hardware components (e.g., electric circuits) and one or more software components for synchronizing data from the active sensor and the passive sensor. The synchronization device further includes one or more sensor synchronization settings for specifying different synchronization points between the active sensor and the passive sensor. The synchronization device can cause the active sensor to transmit laser signals to the measure board. In response to the transmission of the laser signals, the synchronization device can trigger the passive sensor to capture an image of the measure board. The synchronization validation application can analyze the image to determine whether sensor data from the active sensor and the passive sensor are synchronized with each other based on one or more preset synchronization settings.

Embodiments of the disclosure can provide offline laboratory synchronization validation, with end to end coverage from physical sensors to synchronization hardware and software. Once validated, the software components and hardware components in the synchronization device can be deployed in an ADV for real-time driving.

Compared with online real-time sensor synchronization validation, embodiments described herein can provide a higher level of validation accuracy; a shorter turn-around time; and a longer stability test (e.g., weeks or months) to stress the physical sensors, the synchronization hardware and the synchronization software.

In one embodiment, the measure board can be a flat-surfaced board, and can be made of a variety of materials, including wood, cardboard, glass and metal. The camera can be a rolling shutter camera, with modified optical lens and filters to capture laser signals. For example, the infrared filter of the passive sensor can be removed, and one or more optical lens can be added. Further, the configurations of the passive sensor can be modified so that the passive sensor can be controlled and managed by the synchronization device.

In one embodiment, an exemplary process of validating data synchronization between an active sensor and a passive sensor includes the operations of transmitting, from an active sensor, laser signals to a measure board, the active sensor coupled to a synchronization device; in response to the transmission of the laser signals, triggering, by the synchronization device, a passive sensor to capture an image of the measure board; and performing, by a synchronization validation application, an analysis of an image of the measure board captured by the passive sensor to determine whether the passive sensor and the active sensor are synchronized with each other.

FIG. 1 illustrates an example system 100 for validating sensor data synchronization between an active sensor and a passive sensor according to one embodiment.

As shown in FIG. 1, a measure board 113 can be placed in front of an active sensor 109 and a passive sensor 111. The measure board 113 can be a flat-surfaced board made of a variety of materials. For example, the measure board can be a white-colored steel plate. Both the active sensor 109 and the passive sensor 111 are connected to a synchronized device 102, which includes one or more sensor synchronization hardware components 105, one or more sensor synchronization software components 107, and one or more sensor synchronization settings 108.

In one embodiment, the sensor synchronization hardware components 105 can be an integrated circuit that preforms a number of synchronization functions, including providing digital timing signals. The sensor synchronization software components 107 can add timestamps to measures from different sensors, including the active sensor 109 and the passive sensor 111, based on the digital timing signals and acquisition times of the measures; and can synchronize the timestamped measures to the same clock.

The sensor synchronization software components 107 can also include functions for controlling and managing the passive sensor 111, which can be a rolling shutter camera that does not take a snapshot of the entire measure board 113 at a single instant in time but rather by scanning across the measure board 113 rapidly, either vertically or horizontally.

The passive sensor 111 can be modified so that the passive sensor can capture fast moving laser points. For example, the infrared filter of the passive sensor 111 can be removed, and one or more optical lens can be added. Further, setting and configurations of the passive sensor 111 can be modified and tuned so that the the passive sensor 111 can be controlled and managed by the management and controlling functions in the sensor synchronization software components 107. The settings and configurations of the passive sensor 111 can also be modified to align the image center of the passive sensor 111 with the field of view (FOV) of the active sensor 109.

In one embodiment, each of the sensor synchronization settings 108 can define a validation scenario. For example, a synchronization setting can include a different target area on the measure board 113 for the active sensor 109 and a corresponding trigger delay for the passive sensor 111. The trigger delay would enable a synchronization point between the passive sensor 111 and the active sensor 109 to fall in the target area specified in the synchronization setting. A synchronization point is where vertical scan lines of the active sensor 109 are captured on the measure board 113 by the passive sensor 111, and where the vertical scan lines of the active sensor 109 and the horizontal frame lines of the passive sensor 111 have the same capture timestamps.

As a rolling shutter camera, the passive sensor 111 can expose an image frame of the measure board 113 line after line. The number of exposures equals the number of lines in the image frame. Each frame line represents a row of pixel in the image frame. The frame lines can be equally-spaced parallel lines, with a fixed (e.g., 3 milliseconds) offset in between. The passive sensor may also have a trigger delay parameter, which indicates a delay between a given trigger signal and the image capture. A trigger delay can be a positive, zero, or negative. If a trigger delay is zero, the passive sensor 111 starts to take the first frame line of the image of the measure board immediately after the trigger signal. If the trigger delay is negative, the passive sensor 111 can start to capture the first frame line of the image of the measure board prior to the trigger signal. If the trigger delay is positive, the passive sensor 111 can start to capture the first frame line of the image of the measure board after a tine delay as specified by the trigger delay.

By adjusting the trigger delay of the passive sensor 111 and/or time offsets between frame lines, the synchronization device 102 can cause the synchronization point between the active sensor 109 and the passive sensor 111 to fall in a particular target area.

In real-time driving, the active sensor 109 would be mounted on the top of a vehicle, with the FOV of the active sensor 109 aligned with the image center of the passive sensor 111. When the active sensor 109 is used to detect traffic lights, the target area of the active sensor 109 can be above the image center of the passive sensor 111. When the active sensor is used to detect another vehicle, the target area of the active sensor 109 can at the image center of the passive sensor 111. Different target areas of the active sensor 109 and trigger delays of the passive sensor 111 corresponding to the target areas can be stored in the sensor synchronization settings 108.

As further shown in FIG. 1, a synchronization validation application 103 can run on a computer 101 to perform an analysis of images of the measure board 113 captured by the passive sensor 111. The synchronization validation application 103 can examine the images to determine whether the active sensor 109 and the passive sensor 111 are synchronized with each other in accordance with the sensor synchronization settings 108.

In an alternative embodiment, a user can examine the images captured by the passive sensor 111 and make judgements on whether the active sensor 109 and the passive sensor 111 are synchronized with each other based on the user's knowledge or training.

Figure 2:
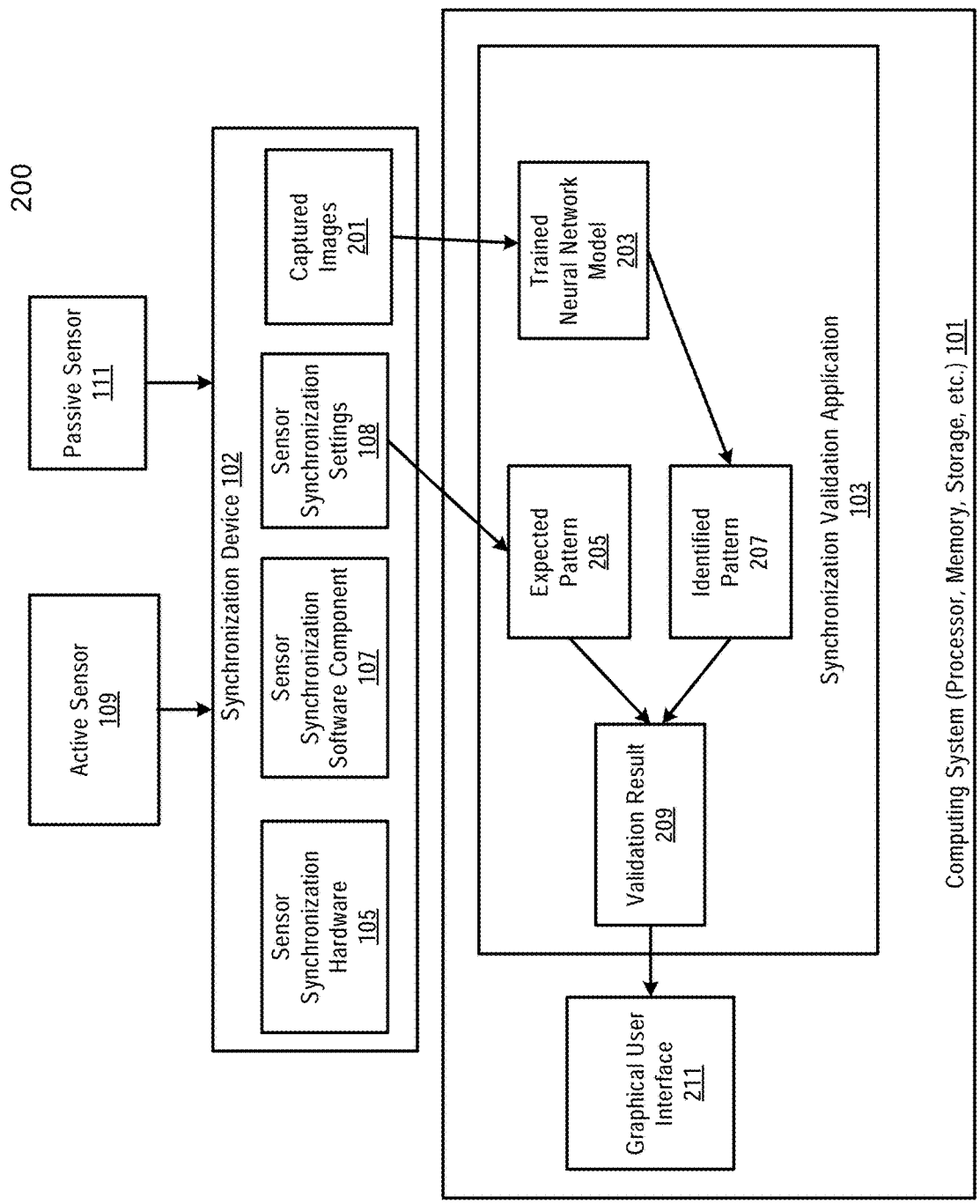
FIG. 2 further illustrates an example system for validating sensor data synchronization between an active sensor and a passive sensor according to one embodiment.

FIG. 2 further illustrates an example system 200 for validating sensor data synchronization between an active sensor and a passive sensor according to one embodiment.

As shown in FIG. 2, the synchronization validation application 103 can include a trained neutral network 203 that takes images 201 of the measure board 113 captured by the passive sensor 111 as inputs, and identifies a pattern 207. The identified pattern 207 can be compared with an expected pattern 205, which is based on a synchronization setting in the sensor synchronization settings 108. Based on the comparison, the synchronization validation application 103 can generate a validation result 209 for display on a graphical user interface 211.

In one embodiment, the measure board 113 can be positioned at a location so that the passive sensor 111 can has its image center on a predetermined spot on the measure board 113. The image center of the passive sensor 111 can be visibly marked, for example, using color tape. The expected pattern 205 and the identified pattern 207 can describe a position of the synchronization point between the active sensor and the passive sensor in relation to the marked image center on the measure board 113.

In one embodiment, when the FOV of the active sensor 109 is aligned with the image center of the passive sensor 111, the synchronization point between the active sensor and the passive sensor on the measure board 112 can be at the image center, directly below the image center, or directly above the image center. The synchronization point is where the passive sensor 111 captures the laser points. When the sensor synchronization feature is disabled, the passive sensor would not be able to capture any laser points. When the sensor synchronization feature is enabled, the passive sensor 111 is expected to capture laser points on the measure board 113 consistently at a fixed position (i.e., synchronization point) given a particular trigger delay.

In one embodiment, the sensor synchronization settings 108 can include multiple synchronization settings corresponding to different validation scenarios, and can be updated with new synchronization settings. The example system 200 can run the validations in accordance with the sensor synchronization settings 108 hundreds of times or thousands of times over a period of weeks or even months. The long stability test can validate the active sensor 108, the passive sensor 111, the synchronization hardware components 105, and the synchronization software components 107 with a higher level of accuracy.

Figure 3:
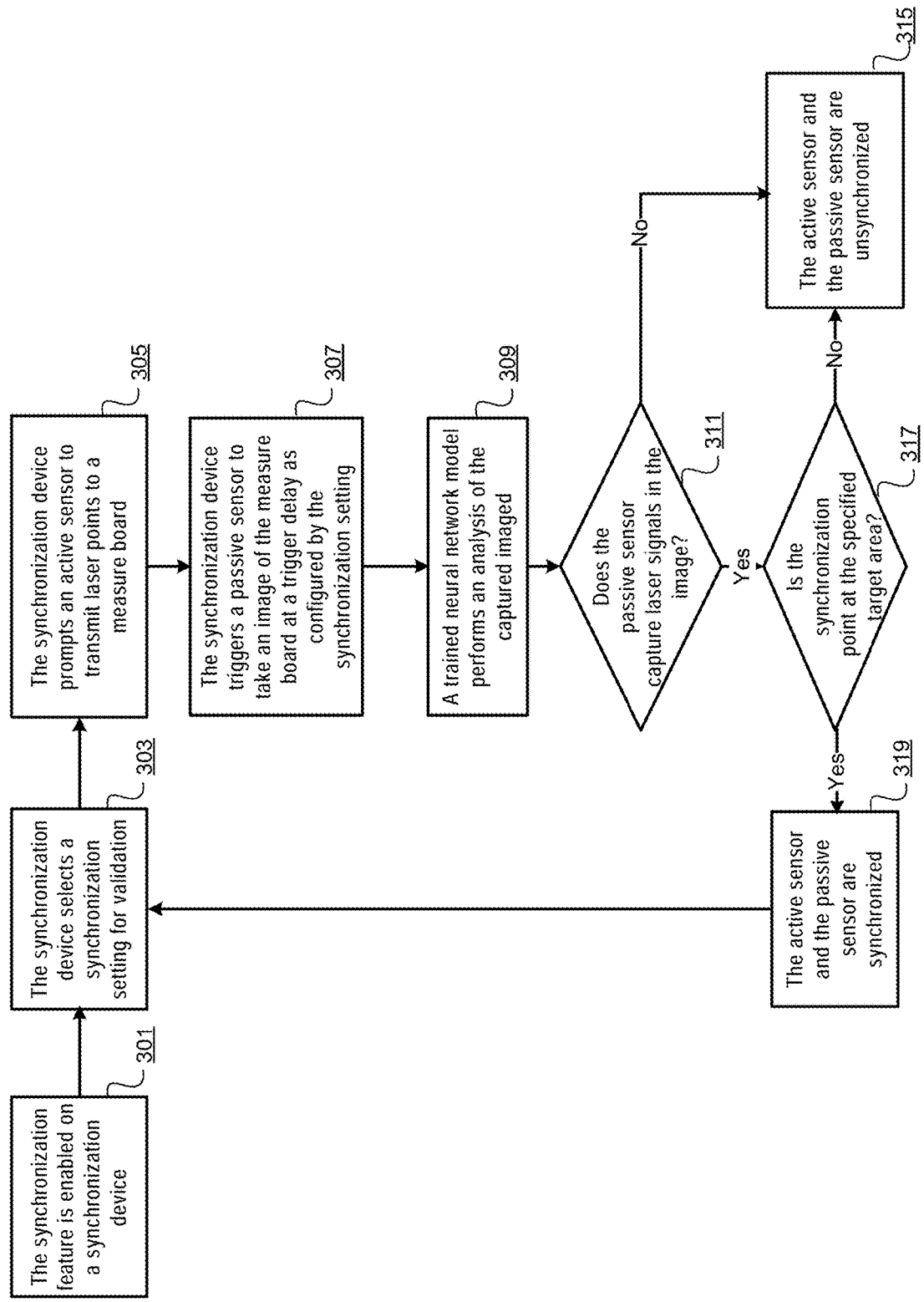
FIG. 3 illustrates an example process of validating sensor data synchronization between an active sensor and a passive sensor according to one embodiment.

FIG. 3 illustrates an example process 300 of validating sensor data synchronization between an active sensor and a passive sensor according to one embodiment. Process 300 may be performed by processing logic which may include software, hardware, or a combination thereof. For example, process 300 may be performed by the synchronization validation application 103, the synchronization device 102, or a combination thereof.

Referring to FIG. 3, in operation 301, the synchronization feature is enabled on a synchronization device. When the synchronization feature is disabled, data from an active sensor and a passive sensor will not be synchronized.

In operation 303, in response to the enabling of the synchronization feature, the synchronization device selects a synchronization setting for validation. The synchronization device can include a number of synchronization settings, each synchronization setting specifying a validation scenario. For example, a validation scenario can include a target area of the active sensor on a measure board and a corresponding trigger delay for a passive sensor, which would cause a synchronization point between the passive sensor and the active sensor to match the target area specified in the synchronization settings. The synchronization settings can be created based on historical driving statistics collected from a particular segment of a road and a high definition map of the road segment.

In operation 305, the synchronization device prompts the active sensor to transmit laser points to a measure board.

In operation 307, in response to the transmission of the laser points, the synchronization device triggers a passive sensor to take an image of the measure board after a pre-configured trigger delay specified in the previously-selected synchronization setting. Both the active sensor and the passive sensor are coupled to the synchronization device, which includes hardware components and software components for synchronization data from different sensors.

In operation 309, a trained neural network model can perform an analysis of the captured image to identify a pattern.

In operation 311, based on the identified pattern, the processing logic can determine whether the image shows any laser points.

In operation 315, the processing logic determines that the passive sensor does not capture any laser points and generates an indication that the active sensor and the passive sensor are unsynchronized.

In operation 317, if the passive sensor captures at least a portion of the laser points, the processing logic can determine whether the captured laser points are visible on the image at the expected location, e.g., a target area specified by the synchronization setting previously selected.

In operation 319, in response to determining that the passive sensor captures the laser points at the expected location on the measure board, the processing logic can determine that the active sensor and the passive sensor are synchronized. The processing logic can subsequently selects another synchronization setting for validation.

Figure 4B:
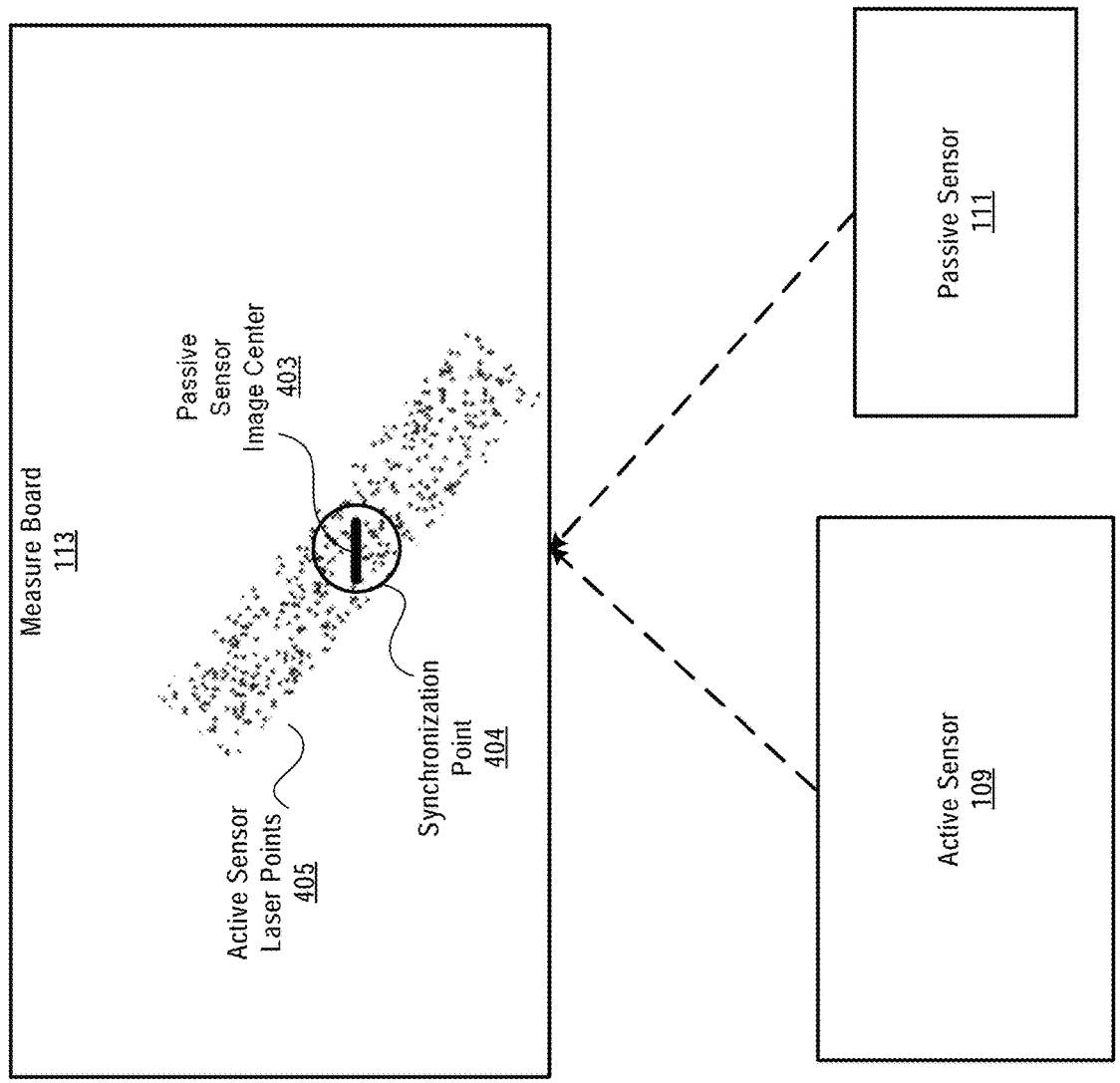
Figure 4C:
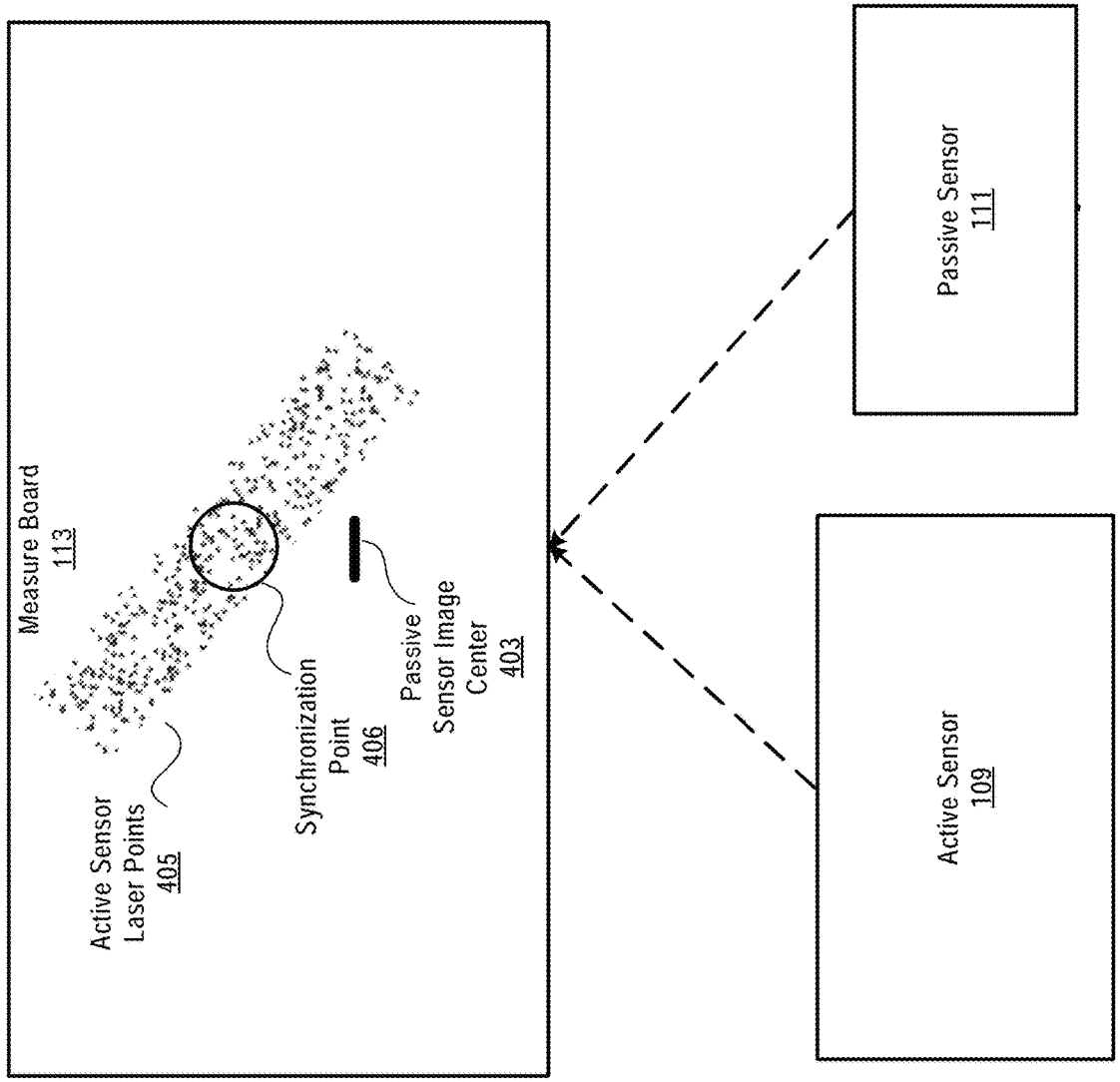

FIG. 4A, FIG. 4B, and FIG. 4C illustrate example validation scenarios according to one embodiment.

In these figures, the measure board 113 can be positioned in front of the active sensor 109 and the passive sensor 111. Since the positions of the active sensor 109, the passive sensor 111, and the measure board 113 are fixed, the image center 403 of the passive sensor 111 is at a fixed location 403 on the measure board 113. The FOV of the active sensor 109 and the image center of the passive sensor 111 are aligned such that the when the trigger delay of the passive sensor is set to zero, the synchronization point between the passive sensor and the active sensor would fall on the image center 403 of the passive sensor 111.

FIG. 4A shows an example validation scenario where the active sensor 109 and the passive sensor 111 are unsynchronized. Therefore, when laser points transmitted from the active sensor 109 reach the measure board 113, the passive sensor would not be able to capture them.

FIG. 4B shows another example validation scenario where the active sensor 109 and the passive sensor 111 are synchronized and the trigger delay of the passive sensor 111 is set to zero. Therefore, the passive sensor 111 can capture laser points 405 at a fixed location. In this example, the fixed location is the image center of the passive sensor 111 and also the synchronization point between the active sensor 109 and the passive sensor 111.

FIG. 4C illustrates yet another example validation scenario where the active sensor 109 and the passive sensor 111 are synchronized and where the corresponding synchronization setting specifies a target area above the image center 403. In this scenario, the synchronization setting also specifies a negative trigger delay that enables the passive sensor 111 to capture the laser point at a synchronization point 406.

For example, the synchronization point 406 can be N frame lines above the image center 403. If the time offset between two adjacent frame lines is M milliseconds, the trigger delay for the passive sensor would need to be set to −N/M milliseconds.

Figure 5:
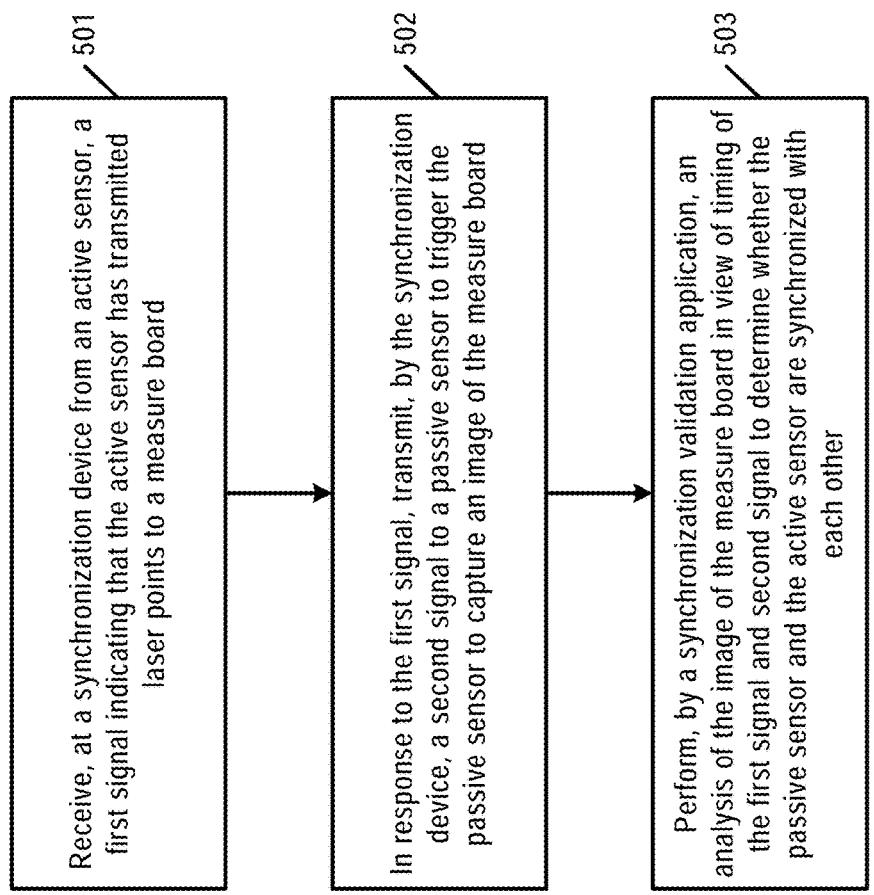
FIG. 5 illustrates an example process of validating sensor data synchronization between an active sensor and a passive sensor according to one embodiment.

FIG. 5 illustrates an example process 500 of validating sensor data synchronization between an active sensor and a passive sensor according to one embodiment. Process 500 may be performed by processing logic which may include software, hardware, or a combination thereof. For example, process 500 may be performed by the synchronization validation application 103, the synchronization device 102, or a combination thereof.

Referring back to FIG. 5, in operation 501, the processing logic receives, from an active sensor, a first signal indicating that the active sensor has transmitted laser points to a measure board. In operation 502, in response to the first signal, the processing logic transmits a second signal to a passive sensor to trigger the passive sensor to capture an image of the measure board. In operation 503, the processing logic performs an analysis of the image of the measure board in view of timing of the first signal and second signal to determine whether the passive sensor and the active sensor are synchronized with each other.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of validating sensor data synchronization, comprising:
   receiving, at a synchronization device from an active sensor, a first signal indicating that the active sensor has transmitted laser points to a measure board, wherein the measure board is a flat-surfaced board and positioned in front of the active sensor and a passive sensor;
   in response to the first signal, transmitting, by the synchronization device, a second signal to the passive sensor to trigger the passive sensor to capture an image of the measure board, wherein the synchronization device includes a plurality of synchronization settings, wherein each synchronization setting specifies a trigger delay for the passive sensor, and a corresponding target area by the active sensor on the measure board, and wherein the trigger delay enables a synchronization point between the active sensor and the passive sensor to fall in the corresponding target area; and
   performing, by a synchronization validation application, an analysis of the image of the measure board in view of timing of the first signal and the second signal to determine whether the passive sensor and the active sensor are synchronized with each other.

2. The method of claim 1, wherein the synchronization device includes one or more electric circuit boards and one or more software modules to synchronize sensor data from the active sensor and the passive sensor.

3. The method of claim 1, wherein the plurality of synchronization settings include a positive trigger delay, a zero trigger, and a negative trigger delay.

4. The method of claim 1, wherein performing the analysis of the image of the measure board further includes
determining that the image captures at least a portion of the laser points on the measure board;
determining that a synchronization point between the active sensor and the passive sensor is located at a position defined by one of the plurality of synchronization settings; and
generating an indication that the active sensor and the passive sensor are synchronized.

5. The method of claim 1, wherein performing the analysis of the image of the measure board further includes
determining that the image does not capture any laser points on the measure board; and
generating an indication that the active sensor and the passive sensor are unsynchronized.

6. The method of claim 1, wherein the passive sensor is a rolling shutter camera, and wherein the passive sensor is light detection and ranging (LiDAR) device.

7. The method of claim 1, wherein the synchronization validation application includes a trained neutral network for performing the analysis of the image of the measure board.

8. A non-transitory machine-readable medium having instructions stored therein, which when executed by a processor, cause the processor to perform operations, the operations comprising:
receiving, at a synchronization device from an active sensor, a first signal indicating that the active sensor has transmitted laser points to a measure board, wherein the measure board is a flat-surfaced board and positioned in front of the active sensor and a passive sensor;
in response to the first signal, transmitting, by the synchronization device, a second signal to the passive sensor to trigger the passive sensor to capture an image of the measure board, wherein the synchronization device includes a plurality of synchronization settings, wherein each synchronization setting specifies a trigger delay for the passive sensor, and a corresponding target area by the active sensor on the measure board, and wherein the trigger delay enables a synchronization point between the active sensor and the passive sensor to fall in the corresponding target area; and
performing, by a synchronization validation application, an analysis of the image of the measure board in view of timing of the first signal and the second signal to determine whether the passive sensor and the active sensor are synchronized with each other.

9. The non-transitory machine-readable medium of claim 8, wherein the synchronization device includes one or more electric circuit boards and one or more software modules to synchronize sensor data from the active sensor and the passive sensor.

10. The non-transitory machine-readable medium of claim 8, wherein the plurality of synchronization settings include a positive trigger delay, a zero trigger, and a negative trigger delay.

11. The non-transitory machine-readable medium of claim 8, wherein performing the analysis of the image of the measure board further includes
determining that the image captures at least a portion of the laser points on the measure board;
determining that a synchronization point between the active sensor and the passive sensor is located at a position defined by one of the plurality of synchronization settings; and
generating an indication that the active sensor and the passive sensor are synchronized.

12. The non-transitory machine-readable medium of claim 8, wherein performing the analysis of the image of the measure board further includes
determining that the image does not capture any laser points on the measure board; and
generating an indication that the active sensor and the passive sensor are unsynchronized.

13. The non-transitory machine-readable medium of claim 8, wherein the passive sensor is a rolling shutter camera, and wherein the passive sensor is light detection and ranging (LiDAR) device.

14. The non-transitory machine-readable medium of claim 8, wherein the synchronization validation application includes a trained neutral network for performing the analysis of the image of the measure board.

15. A data processing system, comprising:
a processor; and
a memory coupled to the processor to store instructions, which when executed by the processor, cause the processor to perform operations, the operations including
receiving, at a synchronization device from an active sensor, a first signal indicating that the active sensor has transmitted laser points to a measure board, wherein the measure board is a flat-surfaced board and positioned in front of the active sensor and a passive sensor;
in response to the first signal, transmitting, by the synchronization device, a second signal to the passive sensor to trigger the passive sensor to capture an image of the measure board, wherein the synchronization device includes a plurality of synchronization settings, wherein each synchronization setting specifies a trigger delay for the passive sensor, and a corresponding target area by the active sensor on the measure board, and wherein the trigger delay enables a synchronization point between the active sensor and the passive sensor to fall in the corresponding target area; and
performing, by a synchronization validation application, an analysis of the image of the measure board in view of timing of the first signal and the second signal to determine whether the passive sensor and the active sensor are synchronized with each other.

16. The system of claim 15, wherein the synchronization device includes one or more electric circuit boards and one or more software modules to synchronize sensor data from the active sensor and the passive sensor.

17. The system of claim 15, wherein the plurality of synchronization settings include a positive trigger delay, a zero trigger, and a negative trigger delay.

18. The system of claim 15, wherein the active sensor and the passive sensor are connected to the synchronized device which includes one or more sensor synchronization hardware components being an integrated circuit that performs a plurality of synchronization functions including providing digital timing signals.

19. The system of claim 15, wherein the passive sensor is a rolling shutter camera scanning across the measure board rapidly, either vertically or horizontally.

20. The system of claim 16, wherein the one or more software modules add timestamps to measures from the active sensor and the passive sensor based on digital timing signals and acquisition times of the measures, and wherein the one or more software modules synchronize the time-stamped measures to a same clock.

* * * * *